Feb. 12, 1957 R. G. RUSSELL 2,780,890
GLASS MELTING FURNACE
Filed June 12, 1952 4 Sheets-Sheet 1
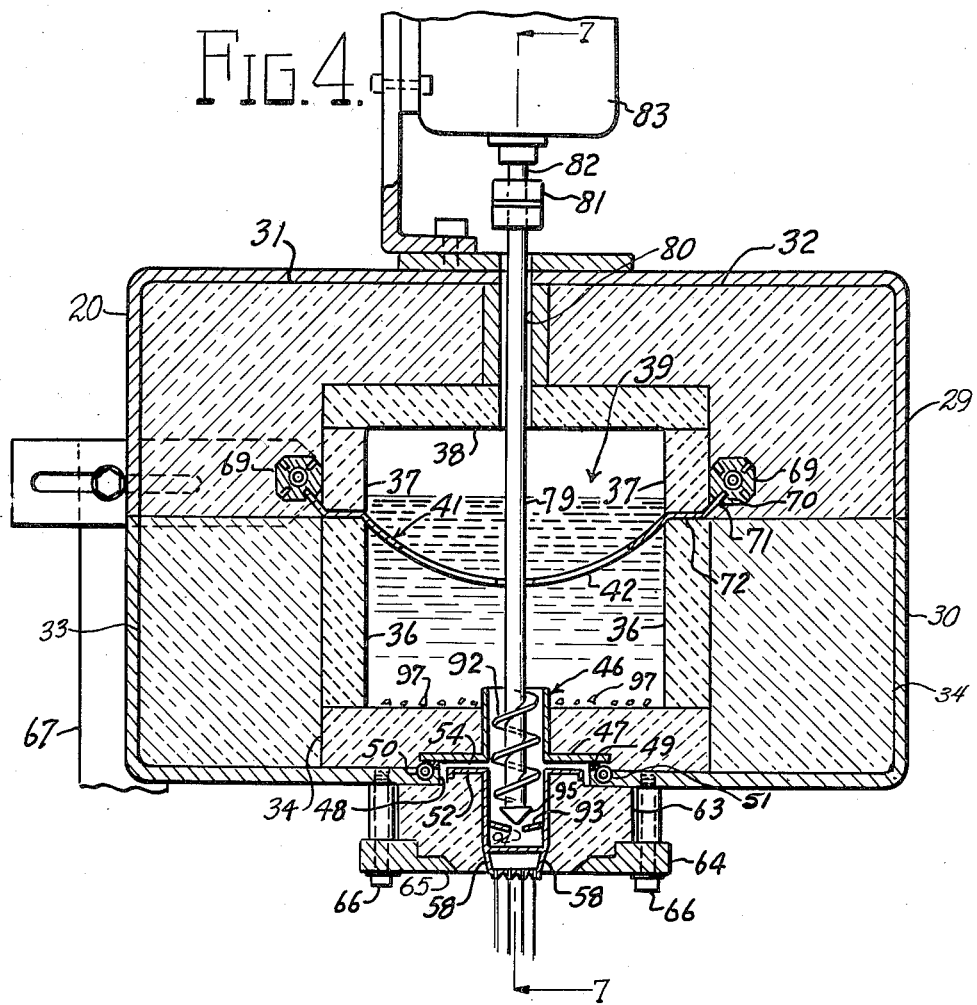
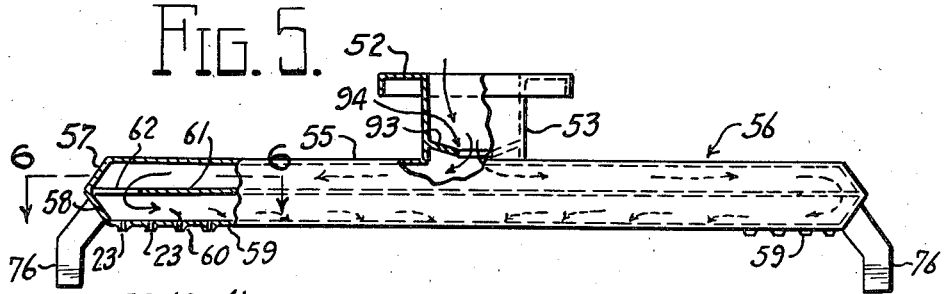
INVENTOR.
Robert G. Russell
BY
Stuelin & Overman
ATTORNEYS

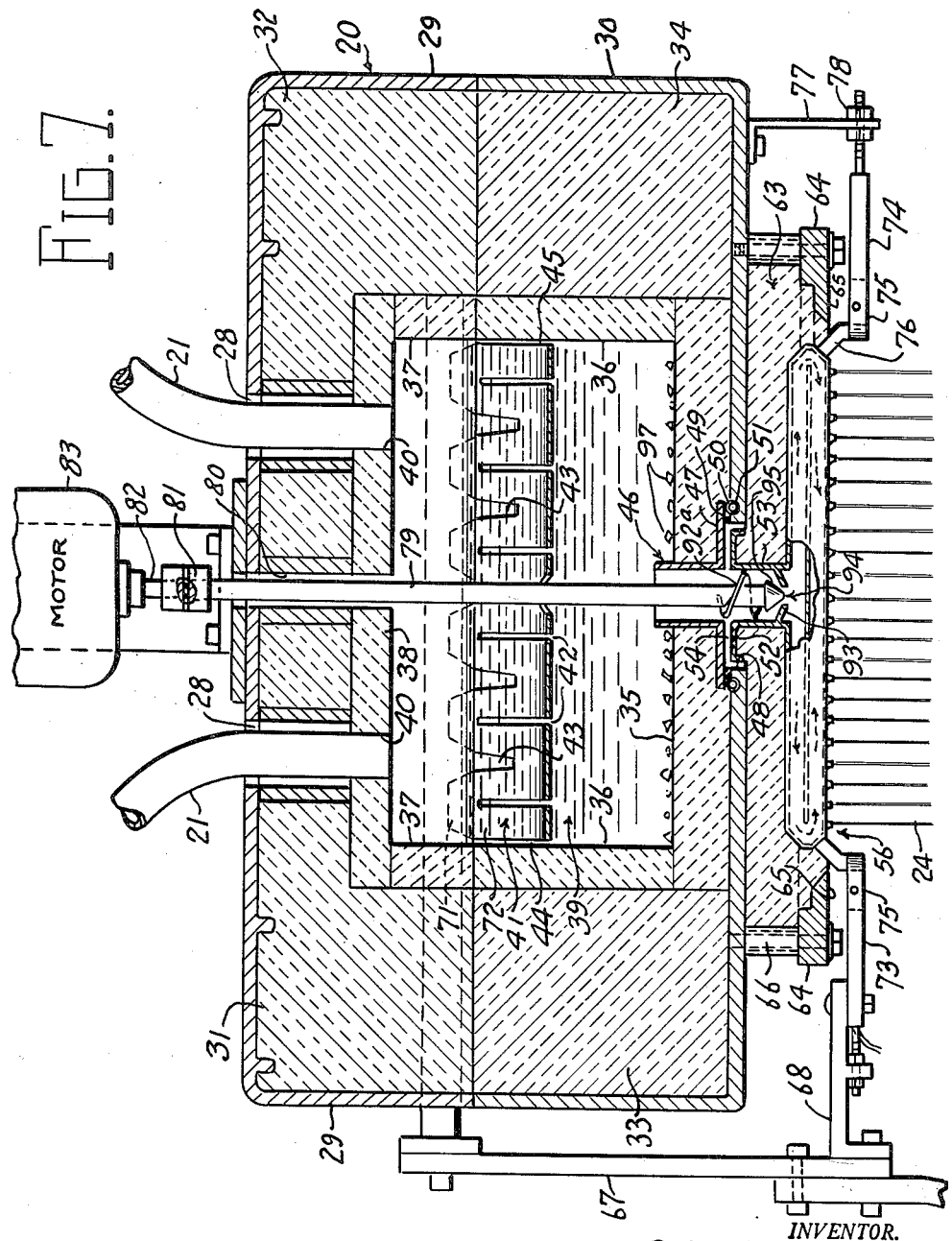

Feb. 12, 1957 R. G. RUSSELL 2,780,890
GLASS MELTING FURNACE
Filed June 12, 1952 4 Sheets-Sheet 3
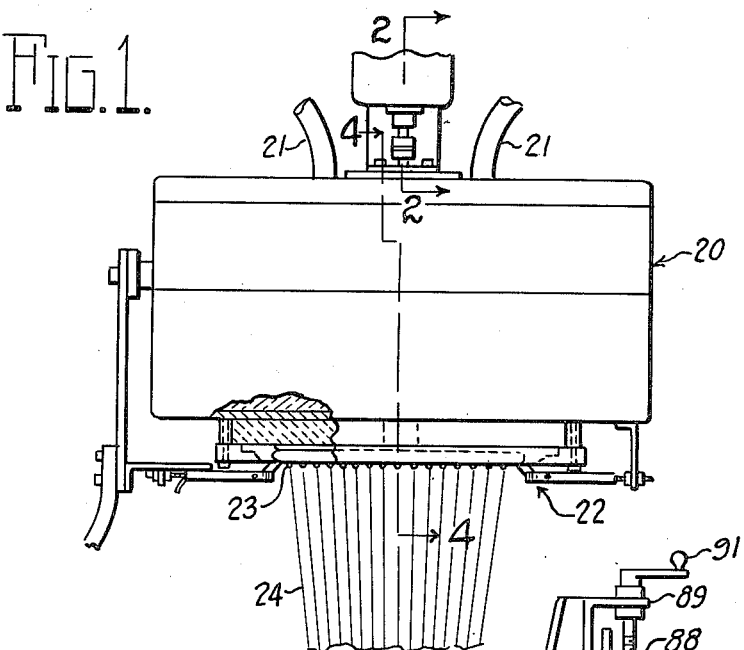
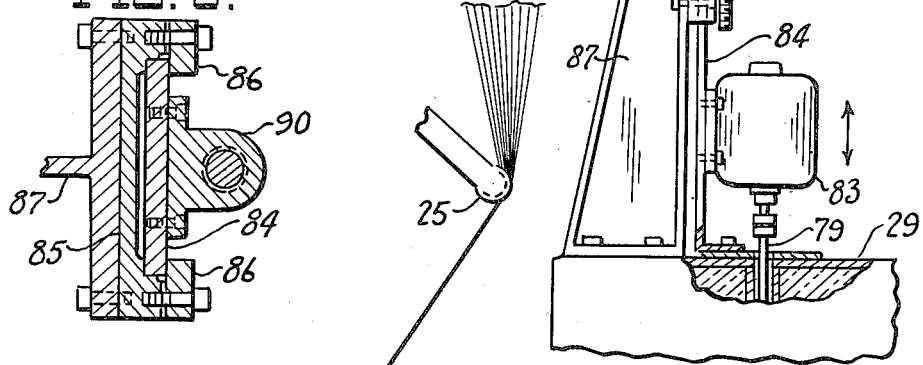
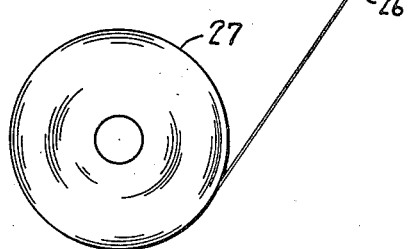
INVENTOR.
Robert G. Russell
BY
ATTORNEYS

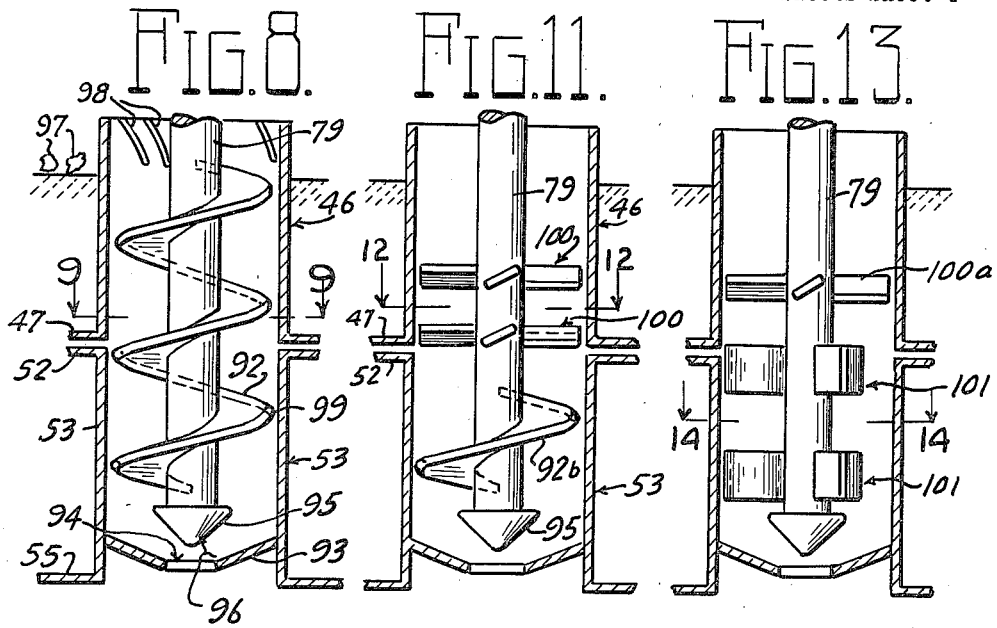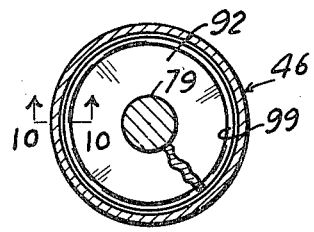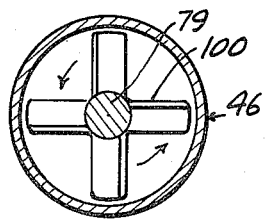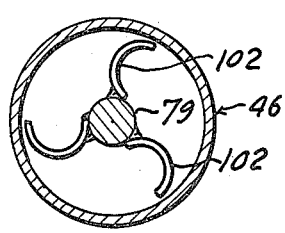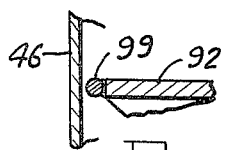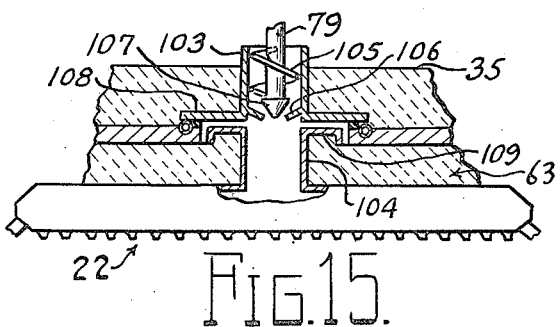

United States Patent Office 2,780,890
Patented Feb. 12, 1957

2,780,890

GLASS MELTING FURNACE

Robert G. Russell, Granville, Ohio, assignor to Owens-Corning Fiberglas Corporation, a corporation of Delaware Application June 12, 1952, Serial No. 293,065

15 Claims. (Cl. 49—17)

This invention relates to glass melting furnaces and more particularly to a furnace designed for a continuous melting operation, for example, the continuous production of glass filaments or fibers.

In the production of continuous glass filaments it is advantageous to have a small handling unit by which can be produced an appropriate number of individual glass filaments or fibers for combining into a generally orientated mass called a strand.

In order that the strand, or a thread, or yarn made therefrom, will have sufficient pliability for use in fabricating textiles, for example, the individual filaments making up the strand ideally should have uniform, identical dimensions, physical and chemical characteristics, and thus identical tensile strength, degree of flexibility, stretch, etc.

Where a considerable number of the individual fibers are simultaneously produced from a single melting unit, a problem is created in the delivery of molten glass to each of the fiber forming orifices at substantially the same temperature, mixture and degree of purity. Where the fibers are all simultaneously being pulled and assembled into a collective strand, if one or more of the fiber forming orifices should become plugged, for example by a nonhomogeneous portion of glass, the entire fiber pulling operation of the particular melting unit must be stopped in order to permit that single orifice to be cleared.

The solution of the problem of presenting glass of uniform characteristics to all of a group of fiber forming orifices is complicated by several factors peculiar to the operation being performed. Each fiber in such a group is formed from a minute stream of glass which is fed through an orifice by physically pulling on the filament forming beneath the orifice as the glass cools. It has been found that in order to keep a filament at a constant diameter certain fixed ratios between the size of the orifice through which the glass flows and the rate of speed at which the congealing fiber is pulled must be maintained.

If the temperature of the glass fluctuates, the diameter of the finished fiber will fluctuate in accordance therewith or the fiber may be broken by pulling, for example, if it cools too rapidly, or if it cools too slowly, since all of the fibers being associated into a strand are pulled at the same rate of speed in the assembly of a strand. It is apparent that discrepancies in glass condition and constituents at the various fiber forming orifices will prevent continuous constant production.

Similarly variations in the viscosity of the flowing glass will cause variations in the rate of flow through the forming orifices and in the characteristics of the fibers formed therefrom.

Various types of individual melting units each designed to provide, say, 200 individual fibers have been designed. Some of these units provide for heating of the glass by radiant energy applied to the surface of a molten pool, others provide for heating the glass by immersion therein of an electrical resistance heater, and still others provide for heating the glass by forming the walls of the unit itself of electroconducting material and applying the heat on all sides of the mass. In other instances, glass discharge control apparatus such as fiber forming bushings have been located at the forehearth of large melting tanks. Advantages for each of these several types have been claimed, but complete uniformity of heating and homogeneity of the mass of molten glass still have not been achieved.

It is therefore the principal object of this invention to provide a glass handling apparatus in which glass is homogenized and rendered uniform in temperature during its delivery to the fiber forming orifices, or other glass discharge control means.

It is another object of this invention to provide a glass handling and/or melting apparatus incorporating means for varying the rate of flow of the glass through the fiber forming orifices independently of the rate of flow determined by the temperature of the glass and the speed at which the filaments are pulled away from the orifices.

It is another object of this invention to provide means for applying pressure to the glass after it has been "fined" and before it flows through the fiber forming orifices in order to control the rate of feed of the glass and thus the production and characteristics of the fibers.

It is yet another object of this invention to provide a molten glass handling apparatus in which the glass must flow through a tortuous path over heating surfaces which continuously apply heat to the flowing mass so as to present it to the several orifices at the same or substantially the same temperature.

A still further object of this invention is the provision of mechanical means within the glass handling apparatus itself for the agitation of the glass during its flow for homogenizing the glass and for dispersing impurities present in the glass.

Yet another object of this invention is to provide a glass melting furnace having mechanical means for agitating the glass to assist in bringing the entire mass of glass to a uniform temperature before the glass is presented to fiber forming orifices.

The invention comprises structure by means of which molten glass is led through a tortuous heated path from a pool to the fiber forming orifices of the device and in which means are provided for creating and in some instances maintaining pressure and controlled flow characteristics within the mass of glass for constantly homogenizing, uniformly heating, and in some cases, feeding the glass.

The structure by which the objects of the invention are realized will be more clearly understood from the specification and from the drawings, in which:

Fig. 1 is a view in elevation, on a small scale and with parts broken away, of a glass melting furnace embodying the invention as set up for the production of a textile strand consisting of a large number of continuous associated fibers.

Fig. 2 is a vertical sectional view on an enlarged scale taken from the position indicated by the line 2—2 of Fig. 1 and showing mechanism not shown in Fig. 1.

Fig. 3 is a further enlarged fragmentary sectional view taken substantially on the line 3—3 of Fig. 2.

Fig. 4 is a greatly enlarged vertical sectional view along the line 4—4 of Fig. 1.

Fig. 5 is a further enlarged view in elevation with parts broken away of the glass filament forming portion of a furnace embodying the invention.

Fig. 6 is a fragmentary horizontal sectional view taken substantially on the line 6—6 of Fig. 5.

Fig. 7 is a vertical sectional view taken on the line 7—7 of Fig. 4 and showing a modified form of a portion of the mechanism.

Fig. 8 is a still further enlarged fragmentary vertical sectional view of homogenizing means with which a furnace embodying the invention may be equipped.

Fig. 9 is a detailed sectional view taken substantially on the line 9—9 of Fig. 8.

Fig. 10 is a fragmentary detailed sectional view on a still further enlarged scale taken on the line 10—10 of Fig. 9.

Fig. 11 is a view similar to Fig. 8 but of a modified form of homogenizing means.

Fig. 12 is a detailed sectional view taken substantially on the line 12—12 of Fig. 11.

Fig. 13 is a view similar to Figs. 8 and 11 but of a further modification of the homogenizing means.

Fig. 14 is a sectional view taken on the line 14—14 of Fig. 13.

Fig. 15 is a fragmentary view on a smaller scale of a modification of the arrangement of the agitating means and the glass discharge control means which facilitates disassembly of the parts.

A glass melting furnace or unit embodying the invention may have an outer casing 20 (Fig. 1) which may be fabricated from sheet or cast metal and serves as a housing for the furnace unit. The casing 20 is shown as being provided with a pair of raw material feeding lines 21 through which cullet or batch may be fed at a substantially constant rate determined either directly, or through intermediate controls, by the rate of feed of the glass filaments or fibers being drawn from the furnace. In the illustrated embodiment of the invention the feeding lines 21 are shown (see also Fig. 7) as tubes and, as is frequently the case in similar furnaces of the prior art, the material to be melted may be fed to a furnace embodying the invention in the form of "marbles" or spherical portions of premelted and resolidified glass.

The rate of feeding of the "marbles" (which are not shown in the drawings) may be controlled by auxiliary mechanism or it may result from the gravity flow of material through the furnace as the glass flows therefrom.

While a furnace of the invention operates especially well when the material fed thereto is cullet, for example the "marbles" mentioned, its operation is not limited to, nor does it require, the use of any particular physical form of raw material. Batch (raw, premixed glass constituents) has been and may be used. Of course, when batch is employed, a modified feeding means may also be used to insure thorough mixture and continuous feeding.

At the bottom of the casing 20, in common with similar melting furnaces of the prior art, a melting furnace embodying the invention is provided with a "bushing" generally indicated at 22 which has a plurality of fiber forming orifices 23 (see also Figs. 4 and 7) through each of which a glass stream first flows, and then as a filament or fiber, is drawn. The fibers 24, as is best seen in Fig. 1, are attenuated or gathered together by means of a gathering eye 25 over which they pass and thence, in the form of a strand 26, may be wound upon a spool 27 or otherwise gathered in packages for subsequent end uses such as the weaving of textile fabrics, the fabrication of ropes, cords and twines, etc.

Figs. 4 and 7 show a furnace embodying the invention in greater detail. The outer casing 20 has a pair of openings 28 in its upper surface through which the material feeding tubes 21 or similar feeding means lead into its interior. The casing 20 may be fabricated from an upper cover 29 and a lower base 30, the two portions of the casing 20 meeting along a general median plane to complete the enclosure.

Interiorly of the casing 20 heat insulating material in the form of shaped blocks 31, 32, 33 and 34 form a protective mass around other thinner blocks 35, 36, 37 and 38. The outer blocks 31–34 inclusive, preferably are fabricated from ceramic heat insulating material but the inner blocks 35–38 preferably should be made from a denser material suitable for contacting molten glass.

The block 35 forms a bottom, the blocks 36 and 37 the sides and the block 38 the top of a rectangular glass melting chamber generally indicated by the reference number 39.

The upper blocks 31 and 32 meet the lower insulating blocks 33 and 34 respectively along the same general median plane in which the cover 29 and body 30 join. Similarly, the side wall blocks 36 are separable from upper sections 37 thereof along the same plane. Thus when it is desired to open a glass melting furnace embodying the invention as, for example, to inspect the condition of its ceramic elements, the heating means yet to be described which are contained therein or the mass of glass melted in the chamber 39, the furnace as a whole may be opened along the horizontal meeting plane of its several structural elements by merely lifting off the upper ones and exposing the interior of the chamber 39.

The material feeding tubes 21 extend downwardly through the vertical openings 28 in the cover 29 and through passageways 40 cut or otherwise formed in the cover block 38 leading directly into the interior of the melting chamber 39 so that cullet or batch fed through the lines 21 is dumped into the chamber 39 from above.

A thin melting element 41 is supported in and extends generally horizontally across the melting chamber 39. The element 41 is cylindrically curved, its axis lying parallel to the longer dimension of the chamber 39. The element 41 is heated by passing a high amperage low voltage current through it and it lies at a level in the melting chamber 39 such that it is entirely submerged in molten or partially melted glass so that both its upper and lower faces transfer heat to the glass mass, thus making most efficient use of its area.

The use of a sheet-like element 41, i. e., one having substantial area, not only provides for more efficient heat transfer, but, by also providing a wide current carrying path, minimizes the effect of local "hot spots" on the electrical resistance of the element and their adverse effect on the consistency of the melting rate and operation.

In the embodiment of the invention illustrated in the drawings, the element 41 is perforated to allow the passage therethrough of molten, or liquid glass, and to prevent unmelted lumps of cullet, such as marbles, or chunks, or unfused lumps of batch, from flowing down to the bottom of the melting chamber 39.

Although the specific form of perforations in the element 41 is not critical, and indeed the heating element 41 need not even be perforated at all, certain end objectives must be kept in mind. As mentioned, a considerable area is desirable to provide for efficient transfer of heat from the hot element 41 to the glass. The element also is employed to "screen" out unmelted lumps of material and thus, when perforated, the perforations should be small enough to prevent such passage.

The perforations are shown as a group of parallel, circumferentially extending slots 42 in the main portion of the element 41 and a plurality of notches 43 cut in the longitudinal edges of the element 41. The slots 42 and notches 43 may overlap each other and may be spaced as shown, to provide what amounts to a plurality of parallel ribbons, or they may be spaced in other ways.

One advantage of the arrangement shown is that it is almost impossible for a crack to progress all the way across the element parallel to its axis.

It will be observed, in Fig. 7 particularly, that the ends of the heating element 41 illustrated in the drawings are spaced from the end blocks 36 of the melting chamber 39 as indicated by the reference numbers 44 and 45. This spacing provides additional screening grooves comparable to the grooves 42 of the melting element 41. The bottom block 35 of the melting chamber 39 is supported by the bottom of the base 30 and located generally centrally therein. A flanged tube 46 extends upwardly through the center of the bottom block 35 with its flange 47 horizontally overlapping the edges of an opening 48 in the base 30. The flange 47 of the tube 46 is electrically insulated from the base 30 by a thin strip of insulating material 49.

Other types of perforated sheets, for examples, grill work, screening, circular openings of small size, etc., may be used but better results probably can be expected where the area of the metal is greater than the area of the perforations, in line with the explanation of the features desirable for efficient heat transfer.

A cooling tube 50 is set in a groove 51 cut in the base 30 circumjacent the opening 48. An upper flange 52 on the top of a tube 53 which is mounted coaxially with the tube 46 extends parallelly to and is spaced from the flange 47. The spacing between the parallel bottom surface of the flange 47 and the top surface of the flange 52 provides a thin annular space indicated by the reference number 54 which communicates with the interiors of the tubes 46 and 53.

The coolant in the tube 50 serves to chill the glass which seeps laterally into the space 54 between the flanges 47 and 52, effecting a chill seal at the outer edges of the space 54 and protecting the insulating strip 49.

At the bottom of the tube 53 (see also Figs. 4 and 5) the metal forming the tube 53 is welded or otherwise secured to a flat top plate 55 on a glass forming bushing generally indicated at 56 (see Figs. 5 and 6 particularly). The bushing 56 is generally rectangular in plan view (Fig. 6) and the top plate 55 has a downwardly turned inclined lip 57 which mates with a similar upwardly turned inclined lip 58 on a spaced bottom plate 59 that extends parallelly to and is substantially the same size as the top plate 55. The bottom plate 59 has a plurality of downwardly extending protuberances 60 through which are drilled the fiber forming orifices 23.

A horizontally extending baffle plate 61 is joined with the mating edges of the lips 57 and 58 extending parallelly to and spaced approximately midway between the top and bottom plates 55 and 59 of the bushing 56. The plate 59 is imperforate throughout its main area but its corners are cut away forming vertical openings 62, one at each corner of the bushing 56. The vertical openings 62 permit molten glass to pass from above the baffle plate 61 to beneath the plate 61.

The general flow pattern of glass through the bushing 56 is indicated by the arrows in Fig. 5. It will be observed that the glass flows downwardly through the tube 53 and strikes the center of the baffle plate 61 where it separates, flowing outwardly along the plate 61 and then downwardly through the openings 62. It then spreads over the upper surface of the bottom plate 59 streaming through the orifices 23 in that plate.

The bushing 56 is supported in position underneath the base 30 by means of a flat, dense ceramic block 63 which is shaped to fit upwardly into the flange 52 and to surround the ends of the bushing 56 lying circumjacent the lips 57 and 58 on the top and bottom plates 55 and 59. The ceramic block 63, as can best be seen in Fig. 4, embraces the inwardly inclined sides of the lips 58, supporting the bushing 56.

The block 63 is, in turn, supported under the base 30 by an open frame 64 which extends around its lower outside corners and has an inwardly extending lip 65 on which the block 63 rests. The frame 64 is securely supported under the base 30 by a plurality of bolts 66 extending upwardly through the frame 64 and screwed into holes in the bottom of the base 30.

The bushing 56 and the heating element 41 are electrically connected in parallel to a source of high amperage, low voltage heating current (not shown) through bus bars 67 and 68 (Figs. 4 and 7) which are connected in turn to a pair of heating element bus bars 69 (Fig. 4) that lie exteriorly of the upper blocks 37 forming part of the side wall blocks 36. Each of the bus bars 69 has at least one longitudinally extending slot 70 into which are tightly forced edges 71 which are formed on the ends of tabs 72 at the sides of the heating element 41.

The bushing 56 is electrically connected to the bus bars 67 and 68 by means of connector clamps 73 and 74 which have fingers 75 that are tightly clamped on downwardly extending contacts 76 (see also Figs. 5 and 6) one at each end of the bushing 56. The clamp 74 is supported from the base 30 by a bracket 77 (Fig. 7) which has an insulating bushing 78 at its lower end.

Electrical current thus flows not only through the heating element 41 which is immersed in the pool of glass maintained in the heating chamber 39 but it also flows through the top plate 55 and bottom plate 59 of the bushing 56 and through the baffle plate 61. As the glass flows through the tortuous path indicated by the arrows in Fig. 5 it is constantly passing over heated surfaces and heat is transferred to the flowing glass right up to the time when it streams through the orifices 23. By reason of the heated baffle plate 61 the glass mass is not "dumped," as it were, at the bottom of the tube 53 but is dispersed over the area of the baffle plate 61 where it again is "thinned out" so that its entire volume can be heated efficiently to a uniform temperature appropriate for its delivery to the orifices 23.

Under some conditions it may be advantageous further to homogenize the molten glass and to further eliminate, break up or provide for dissolution of various refractory "stones" or "cords," i. e., unmelted concentrations of ingredients. The glass melting furnace embodying the invention which is disclosed in the drawings may, therefore, be equipped with a mechanical agitating means. The design of the agitating means may be modified to effect mixture or recirculation, to increase or decrease the rate of flow of the glass through the bushing tube 53, or to achieve various combinations of these results.

The structure embodying a portion of the invention and designed for these purposes may include, among other parts, a vertically extending rotary shaft 79 (see Figs. 4 and 7) which extends downwardly through a vertical opening 80 in the insulating blocks 31 and 32 and in the chamber cover block 38. The shaft 79 is mounted to extend coaxially into the open upper end of the tube 46. At its upper end the shaft 79 is connected by an electrically insulated flexible coupling 81 to a shaft 82 of a driving motor 83. The motor 83 (see also Figs. 2 and 3) is mounted on a movable plate 84 which slides in a vertically extending way formed by a plate 85 and two gibs 86. The plate 85 is fixedly mounted on a bracket 87 which is erected on top of the cover 29 of the casing 20. The motor 83 and the shaft 79 may be raised and lowered by means of a screw 88 which is rotatably mounted in an arm 89 at the top of the bracket 87 and engaged in a threaded ear 90 bolted to the sliding plate 84. A crank 91 is pinned or otherwise secured on the upper end of the screw 88 for rotating the screw 88. When the crank 91 is rotated the screw 88 lifts or lowers the ear 90, the plate 84 and thus the motor 83 and the shaft 79. The motor 83 is electrically connected through a conventional speed changing and reversing circuit so that the shaft 79 can be rotated at selected speeds in either direction.

The lower end of the shaft 79 may be provided with any one of a plurality of different agitators, stirrers or combinations of the two. In Figs. 4 and 8, for example, there is shown in a several turn screw 92 which is welded or otherwise secured on the shaft 79. The screw 92 extends axially from just below the upper edge of the tube 46 to just above a cone baffle 93 (see also Figs. 5 and 7) which extends across the bushing tube 53 just above the level of the bushing top plate 55. The cone baffle 93 has an axial opening 94 in line with the end of the shaft 79 and the shaft 79 may be equipped with a cone tip 95 for cooperation with the opening 94 in the baffle 93 to restrict an annular space (best seen in Fig. 8) indicated by a bracket 96, between the walls of the opening 94 and the surface of the cone tip 95.

It should also be observed that the upper end of the tube 46 extends above the upper surface of the chamber bottom block 35 forming a baffle or weir to trap heavy impurities such as unmelted "stones," for example those indicated by the reference number 97 (Figs. 4, 7 and 8), or heavy unmelted cords. These impurities which may not be dissolved in the mass of glass may be small enough to pass through the straining slots and openings in the heat element 41. If they were carried downwardly into the interior of the bushing 56, however, one of them might come to rest on the open upper end of a fiber forming orifice 23, and might be large enough to block such an orifice, upsetting the manufacturing procedure. By forming the "weir" with the upper end of the tube 46 these impurities are kept within the glass melting enclosure 39 until they have been dissolved into the mass of glass.

The upper end of the tube 46 also may be provided with further strainer means consisting in slots 98 (see Fig. 8, for example). These slots may be cut or sawed in the end of the tube 46 and should be relatively fine, say a fraction of the width of the slots 42 in the melting element 41, in order to strain out impurities. For example the slots may be about 0.020" to 0.030" wide. The slots preferably are cut at an angle in order that if a cord moves downwardly against the edge of the tube it will be deflected at least partially to assist in breaking it into smaller portions.

The screw 92 shown particularly in Figs. 4 and 8 has an outside diameter less than the inside diameter of the tube 46. It has been found that the molten glass passing through the tube 46 acts as a lubricant and a spacing means for the screw 92 keeping it out of contact with the interior of the tube 46. After many hours of operation in a tube 46 of a screw 92 constructed as shown in Fig. 8, examination of the interior of the tube 46 reveals no scratches or other indications of contact. If desired, the edge of the screw 92 or perhaps just the lowest turn of the screw may be provided with a wire 99 (Figs. 8–10) to cover any sharp edges which might conceivably gouge or scratch the interior of the tube 46.

Various modifications of the agitating means may be employed. For example, in Fig. 7 there is shown a screw 92a which is only one turn long rather than substantially the length of the two coaxial tubes 46 and 53.

Other modifications of the agitating and stirring means are illustrated respectively in Figs. 11 and 12 and in Figs. 13 and 14. In the embodiment of the invention shown in Figs. 11 and 12, the lower end of the shaft 79 is provided with a single turn screw 92b located just above the cone point 95 and with two four-bladed propellers 100 which, in this instance, have their blades pitched in the same "hand" as the screw 92b. As is the case in the embodiment of the invention shown in Figs. 8–10, the screw 92b and the propellers 100 of the embodiment of Figs. 11 and 12 do not contact the interior of the tubes 46 or 53. The molten glass flowing in the tube again is relied upon to lubricate and support the agitating means out of contact with the walls of the tubes.

The modification of the invention illustrated in Figs. 13 and 14 incorporates a feed retarding or advancing propeller 100a located above a pair of three-bladed homogenizers 101. Each of the homogenizers 101 is shown as consisting in three half tube sections 102 that are welded or otherwise secured at one edge to the shaft 79 with their axes extending parallel to that of the shaft 79. The homogenizing blades 102 violently agitate the molten glass as it flows downwardly through the tubes 46 and 53 to blend the glass as well as to break up such impurities as "cords" which may find their way into the open upper end of the tube 46.

In the operation of the device the batch or cullet which is fed into the upper end of the chamber 39 through the material lines 21, first is trapped by the generally horizontal heating element 41. It is there exposed to a substantial transfer of heat from the surfaces of the element 41 and strained by being required to flow downwardly through the slots 42 or 43 or the end spaces 44 and 45 of that heating element 41. This thoroughly heats the mass and drives off a substantial portion of any entrained gas. The molten glass continues to flow downwardly through the chamber 39 and must flow horizontally across the bottom of the chamber 39 and up over the "weir" formed by the lip of the tube 46. Again it is strained, the heavy "stones" remaining on the floor of the chamber where they remain until melted.

The glass then flows downwardly through the tube 46 (which is not electrically heated) and reaches the level of the flange 47 of that tube. The molten glass flows outwardly into the annular space 54 and upon reaching the outer edge of that space it is congealed by the cooling influence of the coolant in the tube 50. Thus, glass solidifies in the annular opening 54, serving as a most effective seal between the lower flange 47 of the tube 46 and the upper flange 52 of the lower tube 53.

In those instances, however, where screw or propeller means are present, the shaft 79 may be rotated at a speed and in a direction such as to either advance the rate of flow of the molten glass or to retard its rate of flow. It has been found that the rate of production of molten glass from the glass discharge control means, i. e., the orifices 23, can be varied several fold by appropriate speeds and directions of rotation of such means as the screws 92 and propellers 100. Further control of the rate of flow of the glass is provided by raising or lowering the shaft 79 and thus the cone point 95 with respect to the opening 94 in the baffle 93. If, for example, the shaft 79 is lowered the annular opening 96 (Fig. 8) is reduced and less glass can flow through the smaller orifice.

Where homogenizing means such as the blades 101 (Fig. 13) are employed, the glass is most violently agitated to homogenize its mass, to break up impurities such as "cords," and to prevent their passage downwardly into the bushing 56 where they might adversely effect the flow of the glass through the fine orifices 23 in the bottom plate 59.

In those embodiments of the invention which may not be equipped with rotating homogenizing means, glass merely flows down the tube 53 which may be baffled or open, depending upon the control desired, and then into the bushing 56 above the baffle plate 61.

In Fig. 15 there is illustrated a modification of two glass conducting tubes 103 and 104 in which the agitating means, shown as consisting of a single turn screw 105 and the valving means, comprising a cone baffle 106 and cone tip 107, all are located within the tube 103. It will be seen that parallel spaced flanges 108 on the tube 103 and 109 on the tube 104 are arranged relatively to each other the same as in the earlier modifications of the construction disclosed, to permit the removal of the fiber forming bushing 22 as in the other constructions.

The separation of two tubes 103 and 104 at a level beneath the end of the shaft 79 and its associated screw 105 and cone baffle 106, simplifies the alignment of the two tubes 103 and 104. In each of the earlier modifications of the construction, where the screw 92 or 92a or similar structure extends through both of the tubes 46 and 53, careful alignment of the tubes is necessary to prevent the edge of the screw from binding against the inner surface of one or the other of the tubes 46 and 53.

The location of the two opposed flanges 108 and 109 at the level shown in Fig. 15 can also be used with respect to any of the other modifications of the homogenizing means shown in Figs. 4 and 7 through 14.

Various combinations of the form of the mechanical agitating means disclosed and of the rates and directions of rotation of these mechanical means as well as the spacing of the cone point 95 from its opening 94 can be employed to vary the feeding rates and conditions of the melted glass.

In addition to improved homogenization and uniform temperature of the glass resulting from the thorough mixture produced by the agitating means disclosed, these means have an additional feature particularly in those modifications where they are constructed in the form of screws or propellers. By appropriately selecting the rate and direction of rotation of the drive shaft 79 and its vertical positioning, i. e., the width of the annular space indicated by the reference character 96, pressure can be applied to the glass flowing through the tube 53 and thus in the bushing 22 in order to minimize the adverse effect of variations in viscosity of the glass upon its flow through the orifices and, consequently, upon the characteristics of the fibers formed.

In certain prior art glass forming bushings of the same general type as that disclosed in the drawings, a pressure atmosphere has been provided above the pool of molten glass. Such an atmosphere applies pressure to the glass and forces it through the fiber forming orifices, reducing the adverse effects of variations in viscosity but introducing a difficulty most necessary to be avoided. When the vapor pressure on the upper face of the molten glass is raised, gas dissolved in the glass is not permitted to escape and the glass is not properly "fined." Furthermore, some of the atmosphere may itself be forced into solution in the glass, adding to the problem created by the gases already in solution. If such gases are dissolved in the glass, they are likely to "re-boil" or evolve from solution upon the release of pressure, i. e., as the glass streams leave the orifices at the bottom of the bushing 22. The formation of bubbles in the glass at this point, of course, completely destroys the continuity of flow of the glass streams and all control over the fiber size.

In a unit embodying the instant invention pressure can be applied to the glass in the tube 53 and in the bushing 22. As explained above, at the time of entry of the glass into the open upper end of the tube 46, it has already been thoroughly "fined" by passage through the heating element 41 which most effectively drives off dissolved gases. Since substantially all of the gases have been eliminated before the glass is placed under pressure by the action of agitating means, i. e., the screws 92, 92a, 92b and 105, or the propellers 100 or 100a, placing the glass under pressure by means of these elements does not either drive gas into solution or prevent the escape of gas present in the glass. Thus when the glass under pressure reaches the orifices at the bottom of the bushing 22, no fiber destroying bubbles or "re-boil" is evolved from the glass as its pressure drops.

The advantages of feeding the glass out of the bushing under pressure are numerous, particularly from the standpoints of control of fiber size, rate of production of the fibers, i. e., yardage per hour or weight per hour, and similar controllable characteristics of the formed glass fibers.

A glass melting furnace embodying the invention thus provides effective heat transfer, a tortuous path of progress which in itself mixes, homogenizes, and uniformly heats the glass, and has the additional feature of providing for effective manipulation of the melted glass during its progression for further homogenizing, impurity reduction, control over rate of feed, uniformity of temperature and mix, and other important controllable results.

It is intended, therefore, that the scope of the instant invention shall not be limited by the particular structures disclosed either with or without the additional mechanical agitating means and regardless of the particular form of agitating means employed, as set forth in the subjoined claims.

I claim:

1. A glass melting furnace comprising, in combination, a molten glass chamber, means for introducing material into the upper portion of said chamber, a single downwardly extending, tubular, glass discharge conduit leading from said chamber, rotatable means having glass flow control blades in said conduit, a glass stream feeding element at the lower end of said conduit and having stream forming orifices extending over an area substantially larger than said conduit, and a baffle extending across the lower end of said conduit and overlying such orifices.

2. A glass melting furnace comprising, in combination, a molten glass chamber, means for introducing material into the upper portion of said chamber, a single downwardly extending, tubular, glass discharge conduit leading from said chamber, a rotatable stirrer mounted for selectively controllable rotation in said conduit and having blade-like glass flow disturbing means mounted thereon, a glass stream forming element connected to the lower end of said conduit and having orifices extending laterally over an area substantially greater than said conduit, and a centrally imperforate baffle interposed between said conduit and said orifices.

3. A glass melting furnace comprising, in combination, a molten glass chamber, means for introducing material into the upper portion of said chamber, a single downwardly extending, tubular, glass discharge conduit leading from said chamber, a rotatable stirrer extending downwardly into the upper end of said conduit, means for rotating said stirrer in a selected direction, means for selectively opening and closing the effective area of said conduit, a glass stream forming element connected to the lower end of said conduit and having orifices extending laterally over an area substantially greater than said conduit, and a centrally imperforate baffle interposed between said conduit and said orifices.

4. A glass melting furnace comprising, in combination, a molten glass chamber, means for introducing material into the upper portion of said chamber, a single downwardly extending, tubular, glass discharge conduit leading from said chamber, a shaft extending downwardly into said conduit, screw means on said shaft located in said conduit and substantially covering the cross-sectional area thereof, variable flow valve means in said conduit below said screw means, means for rotating said shaft at various speeds and in a selected direction, a glass stream feeding element connected to the lower end of said conduit and having orifices extending throughout an area substantially larger than said conduit and centrally imperforate baffle means extending horizontally beneath said conduit and overlying substantially the entire area of said feeding element.

5. A glass melting furnace comprising, in combination, a molten glass chamber, means for introducing material into the upper portion of said chamber, a single downwardly extending, tubular, glass discharge conduit leading from said chamber, a shaft extending downwardly into said conduit, screw means on said shaft located in said conduit and substantially covering the cross-sectional area thereof, an annular lip extending around the wall of said conduit, a cone shaped valve member mounted on said shaft and cooperating with said lip to form an annular passage therebetween, means for rotating said shaft at various speeds and in a selected direction, means for raising and lowering said shaft and said valve member for varying the area of the annular passage and a glass stream forming element connected to the lower end of said conduit and having orifices extending throughout an area substantially larger than said conduit and centrally imperforate baffle means extending horizontally beneath said conduit and overlying substantially the entire area of said feeding element.

6. A glass melting furnace comprising, in combination, a molten glass chamber, means for introducing material into the upper portion of said chamber, a downwardly extending, tubular, glass discharge conduit leading from said chamber, a shaft extending downwardly into said conduit, stirrer means on said shaft located in said conduit and substantially covering the cross-sectional area thereof, an annular lip extending around the wall of said conduit, a cone shaped valve member mounted on said shaft and cooperating with said lip to form an annular passage therebetween, means for rotating said shaft at various speeds and in a selected direction, means for raising and lowering said shaft and said valve member for varying the area of the annular passage, a laterally extending glass stream feeding element located beneath said conduit and having a total area larger than said conduit and baffle means extending horizontally beneath said conduit for dispersing glass over said element.

7. A glass melting furnace according to claim 6 in which an electrically energized glass melting element extends at least partially across the molten glass chamber beneath the level of glass material therein.

8. A glass melting furnace according to claim 6 in which the baffle means extending beneath the conduit consists in an imperforate plate and there are passages at the perimeter thereof for glass flowing downwardly thereby to the fiber forming element.

9. A glass melting furnace according to claim 6 in which both the baffle means and the stream feeding element are heated for maintaining the glass in contact therewith in liquid form.

10. A glass melting furnace according to claim 6 in which the stirrer means has at least one complete turn of a screw substantially filling said conduit and an imperforate web.

11. A glass melting furnace according to claim 6 in which the stirrer means has a plurality of separate, spaced blades having discontinuous surfaces.

12. Glass fiber forming apparatus comprising, in combination, a molten glass chamber including means for causing the evolution of dissolved gas and having a generally flat bottom, a glass discharge conduit having an upper end extending into said chamber above the bottom thereof, a rotatable screw in said conduit, an adjustable orifice at the lower end of said conduit, a fiber forming element having a plurality of fixed diameter individual fiber forming orifices extending over an area greater than that of said conduit, said element being in communication with the lower end of said conduit, a heated baffle plate extending across said element beneath said adjustable orifice and above said fiber forming orifices and means for rotating said screw in a selected direction at a selected speed.

13. Glass fiber forming apparatus comprising, in combination, a molten glass chamber including means for causing the evolution of gas and having a generally flat bottom, a glass discharge conduit having an upper end extending into said chamber above the bottom thereof, a rotatable screw in said conduit, an orifice at the lower end of said conduit, a fiber forming element having a plurality of fixed diameter individual fiber forming orifices extending over an area greater than that of said conduit, said element being in communication with the lower end of said conduit, a baffle plate extending across said element beneath said conduit orifice and above said fiber forming orifices and means for rotating said screw in a selected direction at a selected speed.

14. Glass fiber forming apparatus comprising, in combination, a molten glass chamber including means for causing the evolution of gas and having a generally flat bottom, a glass discharge conduit having an upper end extending upwardly into said chamber, a rotatable screw in said conduit, an orifice at the lower end of said conduit, a fiber forming element having a plurality of fixed diameter individual fiber forming orifices extending over an area greater than that of said conduit, said element being in communication with the lower end of said conduit, a baffle plate extending across said element beneath said conduit orifice and above said fiber forming orifices and means for rotating said screw in a selected direction at a selected speed.

15. Glass fiber forming apparatus comprising, in combination, a molten glass supply chamber, means for introducing material into said chamber, a glass discharge passageway leading from said chamber, an orifice at the end of said passageway, glass discharge control means comprising a flow control valve associated with said passageway, means for selectively regulating said valve to change the effective opening of said passageway for selective flow of said molten material through said opening, a fiber forming element having a plurality of fixed diameter individual fiber forming orifices extending over an area greater than that of said passageway, said element being in communication with the end of said passageway, and a baffle plate extending across said element beneath the opening in said passageway and above said fiber forming orifices.

References Cited in the file of this patent

UNITED STATES PATENTS

| | | |
|---|---|---|
| 1,778,775 | Soubier | Oct. 21, 1930 |
| 1,954,732 | Gossler | Apr. 10, 1934 |
| 2,244,267 | Slayter et al. | June 3, 1941 |
| 2,280,101 | Slayter et al. | Apr. 21, 1942 |
| 2,360,373 | Tiede | Oct. 17, 1944 |
| 2,377,772 | Fletcher et al. | June 5, 1945 |
| 2,465,283 | Schlehr | Mar. 22, 1949 |
| 2,482,299 | Stevens | Sept. 20, 1949 |
| 2,485,851 | Stevens | Oct. 25, 1949 |
| 2,515,478 | Tooley et al. | July 18, 1950 |
| 2,569,459 | De Voe | Oct. 2, 1951 |
| 2,570,078 | Spremulli | Oct. 2, 1951 |
| 2,570,079 | Spremulli | Oct. 2, 1951 |